United States Patent [19]

Serafini et al.

[11] Patent Number: 5,706,379
[45] Date of Patent: Jan. 6, 1998

[54] OPTICAL FILTER FOR TELECOMMUNICATIONS

[75] Inventors: Enrico Serafini, Milan; Alberto Zucchinali, Seregno; Fabrizio Marani, Cinisello Balsamo; Massimiliano Martino, Malnate, all of Italy

[73] Assignee: Sirti S.p.A., Italy

[21] Appl. No.: 530,788

[22] Filed: Sep. 19, 1995

[30] Foreign Application Priority Data

Sep. 28, 1994 [IT] Italy ............... MI94A1971

[51] Int. Cl.⁶ .................................... G02B 6/38
[52] U.S. Cl. ............. 385/75; 385/140; 385/38; 385/72
[58] Field of Search ............. 385/73, 75, 74, 385/140, 38, 31, 33, 34, 72

[56] References Cited

U.S. PATENT DOCUMENTS

| 4,982,083 | 1/1991 | Graham et al. ............ 385/140 |
| 5,141,689 | 8/1992 | Lovely ................... 264/138 |

FOREIGN PATENT DOCUMENTS

| 0 360 304 | 3/1990 | European Pat. Off. ........ 385/73 |
| 0481642 | 4/1992 | European Pat. Off. . |
| 2633737 | 1/1990 | France . |
| 56-19016 | 2/1981 | Japan ................... 385/73 |
| 8501118 | 3/1985 | WIPO . |

OTHER PUBLICATIONS

EPO Search Report, Berlin, Dec. 22, 1995, Examiner von Moers, F.
Patent Abstracts of Japan, vol. 011, No. 337, 3 Nov. 1987 & JP-A-62 121405, 2 Jun. 1987.
Patent Abstracts of Japan, vol. 014, No. 430, 14 Sep. 1990 & JP-A-02 167507, 27 Jun. 1990.
Patent Abstracts of Japan, vol. 015, No. 511, 25 Dec. 1991 & JP-A-03 221902, 30 Sep. 1991.
Journal of Lightwave Technology, vol. 9, No. 4, 1 Apr. 1991, pp. 430–435.

*Primary Examiner*—John Ngo
*Attorney, Agent, or Firm*—Hedman, Gibson & Costigan, P.C.

[57] ABSTRACT

An optical filter comprising two ferrules containing a respective duct internally housing a respective portion of optical fibre; the two ferrules are inserted axially aligned within an alignment bush, between said two ferrules there being inserted a vitreous support on which a layer of optically active filtering material is deposited. A method for constructing said optical filter is also described.

5 Claims, 2 Drawing Sheets

OPTICAL FILTER FOR TELECOMMUNICATIONS

This invention relates to an optical filter for telecommunications.

An optical filter is a passive element which is interposed between one or more sources (emitters) and a receiver so that the receiver receives only certain components of the optical spectrum emitted by the source. This element can be used in optical communication networks in proximity to the receiver, along the line, or wherever it is required to discriminate a certain spectral component from the others. The use of this element enables the same optical carrier to be used to transmit a certain number of signals (frequency-division multiplexing), which are then suitably selected as required. The filter transmission characteristics can be low-pass (those optical spectrum components above a certain wavelength are filtered out), high-pass (those optical spectrum components below a certain wavelength are filtered out), or band-pass (a relevant band within the optical spectrum can be transmitted).

In the current state of the art an optical filter is used based on the Fabry-Perot principle. This comprises two perfectly parallel reflecting surfaces, the wavelength (or inversely the frequency) of the passing radiation depending on the distance between said two surfaces.

The aforesaid optical filter consists of two mutually facing ferrules rigidly locked by an external guide body of ceramic material to which they are rigidly fixed. The two portions of optical fibre between which the optical filter is interposed are respectively housed in a respective ferrule.

Such a structure has certain drawbacks. If for example during its operating life that line portion on which it bears is subjected to significant temperature change, the expansion consequent on this alters the distance between the two reflecting surfaces, hence varying the typical radiation frequency at which the filter operates.

In addition its construction is very delicate and complicated, necessitating the installation and dimensional refinement of at least four elements (a reflecting element and a spacer element each side). In this type of optical filter each ferrule is smoothed and lapped at only one end, a uniquely pig-tail configuration being provided. This makes its use and insertion into an existing optical network not easy and indeed often complicated, hence limiting the effective scope of its application.

The object of the present invention is to provide an optical filter which eliminates said drawbacks by allowing easy and reliable use.

This object is effectively attained by an optical filter comprising two ferrules provided with a respective duct housing internally a respective portion of optical fibre, and into which the two ferrules are inserted axially aligned within an alignment bush, characterised in that between said two ferrules there is inserted a vitreous support on which a layer of optically active material is deposited.

Characteristics and advantages of the present invention are described in detail hereinafter by way of non-limiting example with reference to the accompanying drawings, in which.

Figure 1:
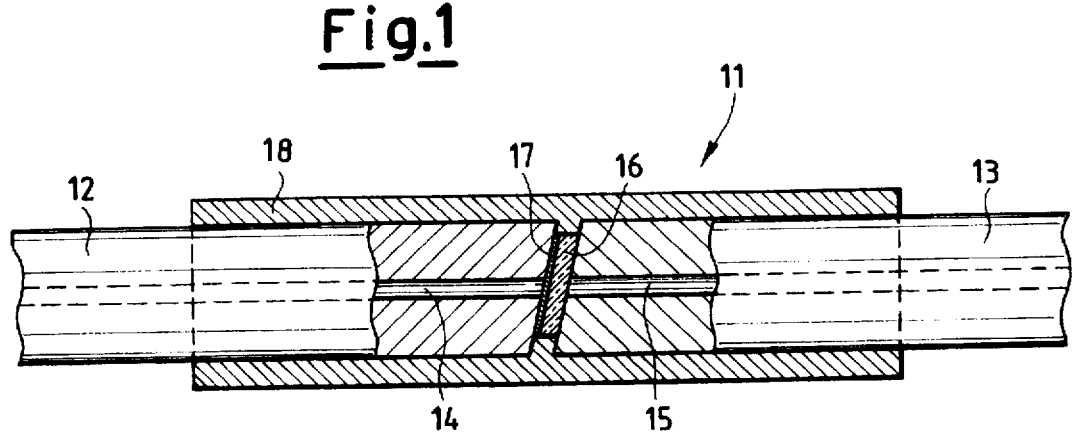
FIG. 1 is a side section through an optical filter according to the present invention.

With reference to FIG. 1, an optical filter according to the present invention shown in its mounted position is indicated overall by 11.

Two ferrules 12 and 13, for example of ceramic material, house within a rectilinear duct provided along their axis two lengths of optical fibre 14 and 15. Interposed between the two ferrules 12 and 13 and glued to one of them by means of adhesive there is a vitreous support 16 provided on its glued surface with a deposit of optically active material 17. The vitreous support 16 has dimensions such as to completely interfere with the optical fibre 14 and 15 but not with its positioning between the ferrules 12 and 13 within an alignment bush 18.

The alignment bush can be of ceramic, metal, plastic or other material.

Figure 3:
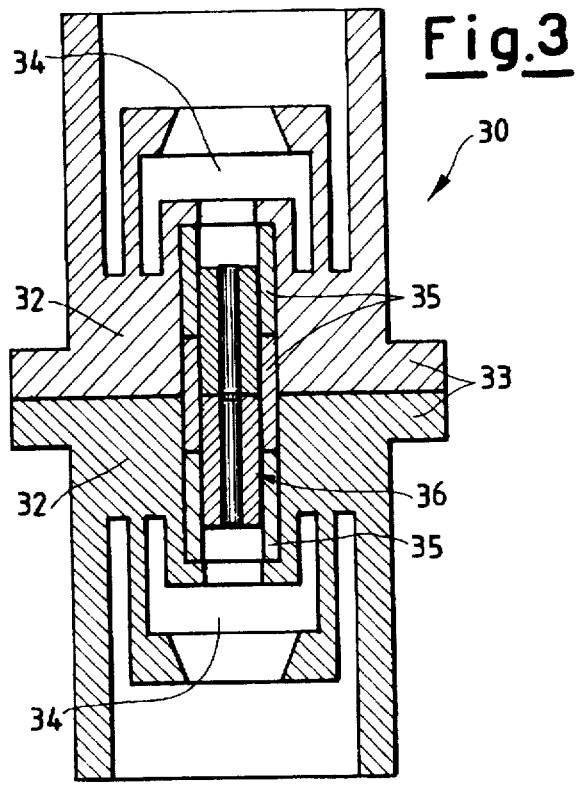
FIG. 3 is a section through an alignment coupling for optical networks into which an optical filter according to the present invention is inserted.

FIG. 3 shows an alignment coupling indicated overall by 30 in female-female configuration. It consists of a pair of casings 32 having at their facing ends two flanges 33 for their fixing together. Each of the two casings 32 comprises axial cylindrical countersunk recesses 34 in which a filter 36 formed in accordance with the present invention is positioned. The reference numeral 35 indicates the three alignment bushes included in the optical filter in this case. The arrangement comprising three bushes allows better alignment of the two optical fibres.

Figure 4:
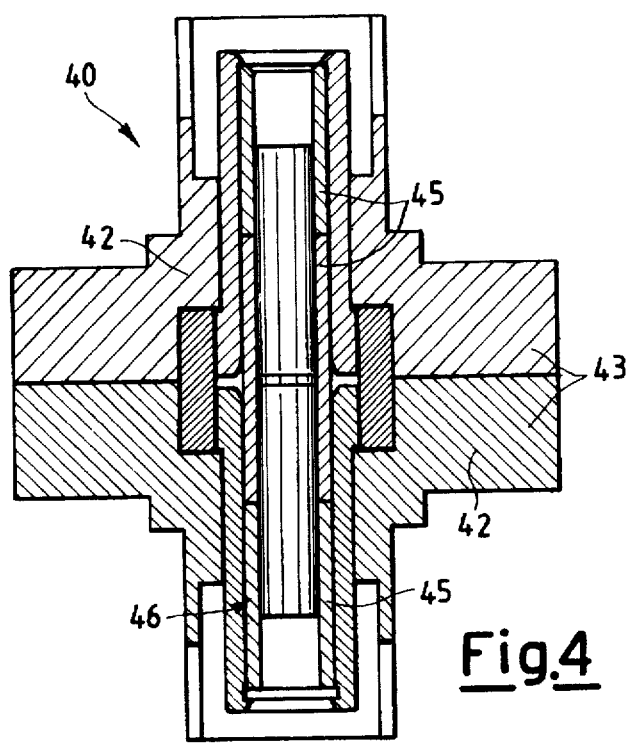
FIG. 4 is a section through a second alignment coupling as heretofore.

FIG. 4 shows a second configuration of a female-female alignment coupling, here indicated overall by 40, and comprising two casings 42 having two flanged ends 43 for their fixing together. Again in this second configuration there are three bushes 45 containing the optical element 46 formed in accordance with the present invention.

Figure 5:
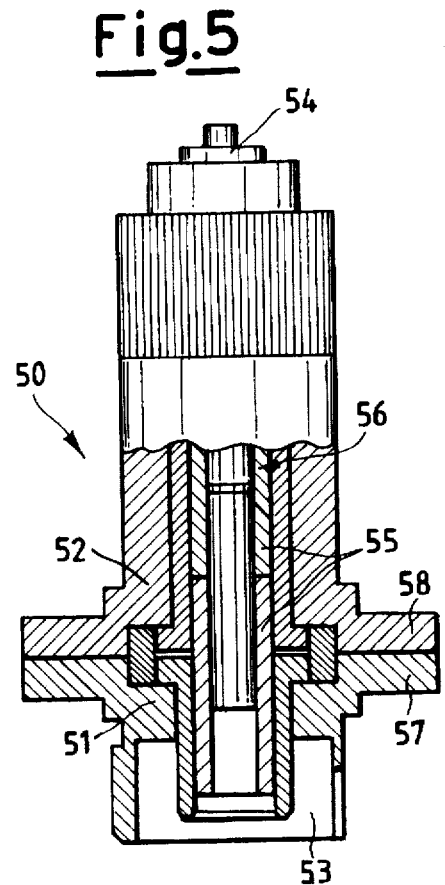
FIG. 5 is a section through a third alignment coupling in male-female configuration.

FIG. 5 shows an alignment coupling in male-female configuration, indicated overall by 50 and consisting of two casings 51 and 52. These comprise fixing flanges indicated respectively by 57 and 58. At its non-flanged free end the casing 51 comprises a female termination indicated by 53, whereas at its opposite free end the casing 52 comprises a male termination indicated by 54. An optical filter 56 formed in accordance with the present invention is present within countersunk recesses, it being inserted this time into two alignment bushes 55.

The optical filter according to the present invention is constructed by the following steps:

inserting a respective optical fibre portion into each of two ferrules;

smoothing and lapping at least one end of each ferrule;

depositing a layer of optically active filtering material onto a vitreous support having a cross-section slightly less than that of the ferrules but greater than the cross-section of the optical fibre;

by means of a suitable adhesive, gluing said vitreous support to a lapped end of a ferrule, in such a manner that the vitreous support totally interferes with the cross-section projected onto it of the optical fibre contained within the ferrule;

aligning the two ferrules and bringing them into mutual proximity by inserting them into a bush.

Figure 2:
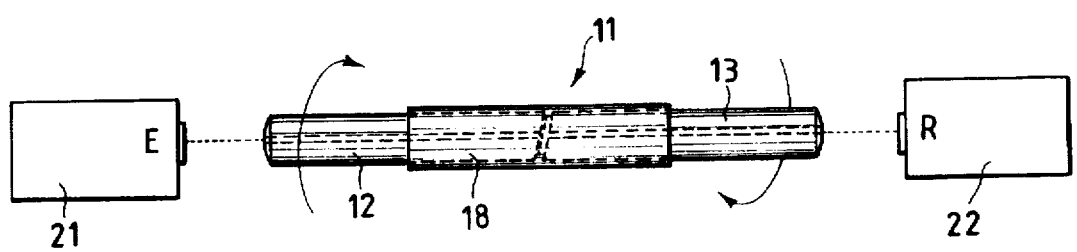
FIG. 2 is a schematic illustration of an optical filter according to the present invention inserted between an emitter and a receiver.

After these construction steps, as shown in FIG. 2 the filter 11 is connected at one end to any type of optical signal emitter 21, and at the other end to an optical signal receiver and measuring device 22. In this manner the signal attenuation by the filtering element due to misalignment and other constructional defects can be immediately checked and measured. By rotating the two ferrules relative to each other the position can now be determined for which this attenuation is a minimum. It should be noted that such mutual rotation is very small (of the order of degrees).

When the minimum attenuation position has been determined, the ferrules are securely fixed to the bush in said position by a glue, for example epoxy resin.

The fact that the filtering element according to the present invention consists of a deposit of optically stable material makes the element insensitive to any temperature variation of the environment in which it is used. Both ends of each ferrule can be smoothed and lapped (lapping oblique at one end and flat at the other or oblique or flat at both), so as to strongly reduce optical signal reflection.

The obliqueness of the positioning of the vitreous support with its filtering deposit is an essential characteristic of the present invention, in that this expedient avoids the harmful phenomenon of retroreflection of the optical signal. This hence prevents part of the signal reaching the filtering element being reflected rearwards if this latter is wrongly inclined, and re-entering the original fibre to seriously compromise signal integrity.

By varying the composition and type of material deposited on the vitreous support the filter can be arranged to operate in various different ways. Hence a band-pass filter (the traditional case) can be formed, as can be equally easily a high-pass or a low-pass filter.

From the constructional viewpoint the optical filter of the present invention allows a much wider range of application than the traditional optical filter.

We claim:

1. An optical filter comprising two ferrules provided with a respective duct housing internally a respective portion of optical fibre, and into which the two ferrules are inserted axially aligned within an alignment bush, characterised in that between said two ferrules there is inserted a vitreous support on which a layer of optically active material is deposited said vitreous support having two surfaces oblique to the bush axis.

2. An optical filter as claimed in claim 1, characterised in that said two ferrules are smoothed and lapped at one end, and at their other end comprise a portion of optical fibre.

3. An optical filter as claimed in claim 1, characterised in that said vitreous support has a cross-section less than the cross-section of each of the two ferrules.

4. An optical filter as claimed in claim 1, characterised in that said vitreous support has a cross-section greater than the cross-section of each of said portions of optical fibre.

5. An optical filter as claimed in claim 1, characterised by comprising at least one further alignment bush.

* * * * *